United States Patent [19]

Eckel et al.

[11] Patent Number: 5,621,029
[45] Date of Patent: Apr. 15, 1997

[54] FLAME RETARDANT THERMOPLASTIC POLYCARBONATE MOULDING COMPOSITIONS

[75] Inventors: Thomas Eckel, Dormagen; Karl Fuhr, Krefeld; Dieter Wittmann, Leverkusen; Heinrich Alberts, Odenthal, all of Germany

[73] Assignee: Bayer AG, Leverkusen, Germany

[21] Appl. No.: 562,585

[22] Filed: Nov. 24, 1995

[30] Foreign Application Priority Data

Dec. 5, 1994 [DE] Germany .......................... 44 43 164.3

[51] Int. Cl.⁶ .................................................. C08K 5/523
[52] U.S. Cl. ............................................ 524/127; 524/145
[58] Field of Search .................................. 524/127, 265, 524/145

[56] References Cited

U.S. PATENT DOCUMENTS

| | | | |
|---|---|---|---|
| 4,273,691 | 6/1981 | MacLaury et al. | 260/23 |
| 4,387,176 | 6/1983 | Frye | 524/268 |
| 4,536,529 | 8/1985 | Frye et al. | 524/284 |
| 4,871,795 | 10/1989 | Pawar | 524/267 |
| 5,030,675 | 7/1991 | Wittmann et al. | 524/130 |
| 5,061,745 | 10/1991 | Wittmann et al. | 524/139 |
| 5,100,958 | 3/1992 | Fuhr et al. | 525/66 |
| 5,122,556 | 6/1992 | Kambour | 524/127 |
| 5,135,973 | 8/1992 | Fukasawa et al. | 524/94 |
| 5,204,394 | 4/1993 | Gosens et al. | 524/127 |
| 5,204,395 | 4/1993 | Lupinski | 524/265 |
| 5,242,744 | 9/1993 | Schryer | 428/224 |
| 5,290,836 | 3/1994 | Truyen | 524/127 |
| 5,455,292 | 10/1995 | Kakegawa et al. | 524/127 |

FOREIGN PATENT DOCUMENTS

| | | |
|---|---|---|
| 0171826 | 2/1986 | European Pat. Off. . |
| 0363608 | 4/1990 | European Pat. Off. . |
| 0520186 | 12/1992 | European Pat. Off. . |
| 521628 | 1/1993 | European Pat. Off. . |
| 05222653 | 1/1993 | European Pat. Off. . |
| 594021 | 4/1994 | European Pat. Off. . |
| 4040243 | 9/1991 | Germany . |
| 4200247 | 7/1993 | Germany . |
| 4301730 | 7/1993 | Germany . |
| 6-228426 | 8/1994 | Japan . |

OTHER PUBLICATIONS

Database WPI, Week 9431, Derwent Publications Ltd., AN 94–252945, Abstract of JP–A–06 184 357 (Asahi Kasei Kogyo KK), Jul. 5, 1994.
Orbit Abstract of DE 40 40 243 (Sep. 12, 1991).
Orbit Abstract of DE 42 00 247 (Jul. 15, 1993).
Orbit Abstract of DE 43 01 730 (Jul. 29, 1993).

*Primary Examiner*—Veronica P. Hoke
*Attorney, Agent, or Firm*—Connolly & Hutz

[57] ABSTRACT

This invention relates to halogen-free flame retardant thermoplastic moulding compositions prepared from polycarbonate and graft polymer, which may optionally contain thermoplastic copolymer and/or polyalkylene terephthalate.

The flame retardant used is a synergistic combination of silicone resin and polyphenylene oxide.

20 Claims, No Drawings

FLAME RETARDANT THERMOPLASTIC POLYCARBONATE MOULDING COMPOSITIONS

This invention relates to halogen-free flame retardant thermoplastic moulding compositions prepared from polycarbonate and graft polymer, which may optionally contain thermoplastic copolymer and/or polyalkylene terephthalate. The flame retardant used is a synergistic combination of silicone resin and polyphenylene oxide together with a specific phosphorus compound.

U.S. Pat. No. 5,061,745 and U.S. Pat. No. 5,030,675 describe flame resistant thermoplastic moulding compositions prepared from aromatic polycarbonate, ABS polymer, copolymer or polyalkylene terephthalate together with monophosphate and fluorinated polyolefins as flame retardant and anti-dripping agent respectively. One disadvantage of the fluorinated polyolefins which may be cited is their halogen content and the hydrogen fluoride arising therefrom in the event of fire. However, the specific use of polytetrafluoroethylene has hitherto been the only way of producing self-extinguishing moulding compositions from aromatic polycarbonates, optionally thermoplastic copolymers and thermoplastic polyalkylene terephthalates and graft polymers with the rating V-0 with 1.6 mm thick test specimens to UL-94.

EP-0 363 608 describes polymer blends made from aromatic polycarbonate, copolymers and graft polymers together with oligomeric phosphates based on, for example, hydroquinone and resorcinol as flame retardant additives. Effective flame retardancy of V-0/1.6 mm to UL-94 is achieved only in the presence of polytetrafluoroethylene.

U.S. Pat. Nos. 4,273,691, 4,387,176, 4,536,529, 4,871,795 and 5,242,744 claim thermoplastics with a flame retardant system prepared from silicone oil or from a mixture of a silicone oil and a silicone resin together with a metal soap (Mg stearate) and optionally magnesium hydroxide. Flame retardants containing halogen (decabromodiphenyl ether), together with antimony trioxide and ammonium polyphosphate with polyhydric alcohols are listed as further additional flame retardant additives. The principal thermoplastics are polypropylene and other polymers, while polycarbonate and, for example, some polyesters are mentioned in general terms. It should be pointed out here that the use of magnesium compounds causes a distinct degradation of the good mechanical properties of polycarbonate, V-0/3.2 mm may be achieved only if halogen is also used (U.S. Pat. No. 4,387,176, column 2, lines 12 to 20) and phosphoric acid esters are not used.

EP-A 0 520 186 describes flame retardant moulding compositions prepared from polycarbonate also mixed with ABS components, which contain a phosphorus compound, a boron compound, a polyorganosiloxane and/or a resin containing fluorine as the flame retardant. It is clear from the examples and comparative examples that the desired flame retardancy of V-0/1.6 mm may be achieved only with the combined use of triphenyl phosphate, zinc borate and polydimethylsiloxane and/or polytetrafluoroethylene, while without zinc borate and triphenyl phosphate but with polydimethylsiloxane, V-0/1.6 mm is not achieved (see EP-A 0 520 186, comparative example 4), with polytetrafluoroethylene instead of polyorganosiloxane only V-1/1.6 mm is achieved (see EP-A 0 520 186, comparative example 5).

DE-OS 4 301 730 describes the provision of effective flame retardant properties in polycarbonate moulding compositions in a virtually analogous manner to EP-A 520 186 with zinc salts of carboxylic acids (for example zinc acetate) being used instead of a boron compound (zinc borate). In the absence of this component, V-0/1.6 mm is likewise not achieved with triphenyl phosphate and dimethylsiloxane (see DE-OS 4 301 730, comparative examples 6 to 8).

U.S. Pat. No. 5,100,958 claims the production of coprecipitation products from silicone resins and ABS type graft polymers and blending this coprecipitation product with polycarbonate and styrene/acrylonitrile copolymer. In order to achieve effective flame retardancy of V-0/1.6 mm, triphenyl phosphate must also be used as an additional flame retardant and the polycarbonate must moreover contain 10 wt. % of tetrabromobisphenol A (see U.S. Pat. No. 5,100, 958, table I, column 7, line 23). Flame retardancy is not achievable without halogen with the moulding compositions of U.S. Pat. No. 5,100,958.

Thermoplastic moulding compositions prepared inter alia from aromatic polycarbonates, polyphenylene ethers, graft polymers, styrene copolymers together with 0 to 20 wt. % of organic phosphates and 0 to 2 wt. % of tetrafluoroethylene polymers are known from DE-OS 4 200 247. The object of the invention was to provide thermoplastic polycarbonate moulding compositions with a good overall range of properties, in particular with elevated heat resistance. This is demonstrated in DE-OS 4 200 247 in examples 1 and 2 relative to comparative examples. It is clear from example 2 that flame retardancy V-0 to UL-94 is achieved with the components polyphenylene oxide, triphenyl phosphate and polytetrafluoroethylene. The use of polyphenylene ethers with phosphates alone without also using polytetrafluoroethylene in order to achieve flame retardancy of V-0/1.6 mm to UL-94 is not described.

EP-A 522 653 describes ABS/graft rubbers with polyphenylene ethers or novolaks and inter alia bis-phosphates as flame retardants. Typical copolymers or polycarbonate may also be used. The flame retardancy of the particular blend is stated in the form of the oxygen index (LOI value according to ASTM). In EP-A 522 653, example 3, table 3 with ABS and polycarbonate (40 wt. % each), 10 wt. % each of polyphenylene ether and hydroquinone bis-(diphenyl phosphate) are used to impart flame retardancy, the LOI value is 23.5 (a relatively low value, with no description of the dripping behaviour). It could not be assumed from a knowledge of EP-A 522 653 that, by replacing the hydroquinone with resorcinol bis-(diphenyl phosphate) and also using readily flammable typical copolymers, a non-dripping V-0/1.6 mm may be achieved, i.e. distinctly higher flame retardancy without dripping (halogen-free, without using polytetra-fluoroethylene).

U.S. Pat. No. 5,204,395 describes polyphenylene oxide moulding compositions containing fillers which have been treated with silicone oil. The combination of a specific filler and silicone results in a reduction of burn time. Phosphorus compounds are not mentioned as flame retardants.

According to EP-A 0 171 826, the addition of small proportions of polyhydrogensiloxanes to polycarbonate/poly-phenylene ether blends leads to distinctly better melt stability.

It has been found that by using a combination of 0.5 to 5 wt. % of silicone resin and 2 to 15 wt. % of polyphenylene oxide in conjunction with 3 to 18 wt. % of phosphorus compound according to component E) described below, self-extinguishing without burning dripping to UL-94 with a rating of V-0 to V-1 in 1.6 mm thick test specimens is achieved in moulding compositions prepared from thermoplastic aromatic polycarbonates, optionally thermoplastic copolymers and thermoplastic polyalkylene terephthalates, together with graft polymers. The polytetrafluoroethylene hitherto used as anti-dripping agent is not required. The moulding compositions according to the invention thus constitute moulding compositions which are completely halogen-free, highly effective and self-extinguishing in the event of fire. The synergistic action of the combination according to the invention of silicone resin and polyphenylene oxide leads to a distinct reduction in the required quantities of flame retardants. The moulding compositions according to the invention have distinct advantages in relation to impact strength, stress cracking resistance and heat resistance properties.

The present invention provides halogen-free, flame retardant thermoplastic moulding compositions which do not produce burning drips in the event of fire, consisting of A) 50 to 95 wt. %, preferably 60 to 90 wt. %, of thermoplastic aromatic polycarbonate, B) 0 to 20 wt. %, preferably 1 to 15 wt. %, of copolymer or polycondensation product consisting of
  B.1) thermoplastic copolymer prepared from
    B.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and
    B.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide, vinyl acetate or mixtures thereof and/or
  B.2) thermoplastic polyalkylene terephthalate, C) 3 to 18 wt. %, preferably 5 to 15 wt. %, of graft polymer produced from
  C.1) 5 to 90 wt. %, preferably 30 to 80 wt. %, of a mixture prepared from
    C.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and
    C.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide or mixtures thereof on
  C.2) 10 to 95 wt. %, preferably 20 to 70 wt. %, of rubber with a glass transition temperature $T_g$ of $\leq 10°$ C., D) 1 to 20 wt. %, preferably 2 to 15 wt. %, of a combination with flame retardant action prepared from
  D.1) 5 to 50 wt. %, preferably 5 to 25 wt. %, of silicone resin and
  D.2) 50 to 95 wt. %, preferably 75 to 95 wt. %, of thermoplastic polyphenylene ether, E) 3 to 18 wt. %, preferably 5 to 15 wt. %, of phosphoric acid ester prepared from
  E.1) phosphorus compounds of the formula (I),

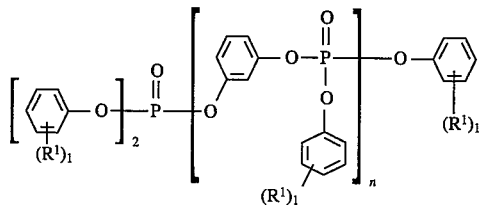

in which
n is a number from 1 to 5,
$R^1$ is methyl and
l is a number from 0 to 5, preferably 0 and 1 to 3, or E.2) a mixture of phosphorus compounds of the formula (I) and phosphorus compounds of the formula (II),

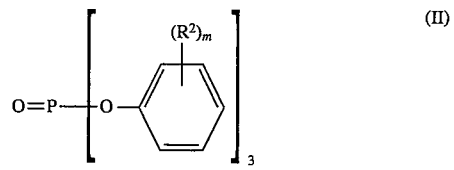

in which
$R^2$ is methyl and
m is the number 0 or 1 to 5, preferably 0 and 1 to 3, wherein the quantity of phosphorus compounds of the formula (II) in the phosphate mixture prepared from E.1) and E.2) is at most 35 wt. %, preferably at most 30 wt. %.

Component A)

Component A) thermoplastic polycarbonates which are suitable according to the invention may be both homo- and copolycarbonates prepared from diphenols of the formula (III),

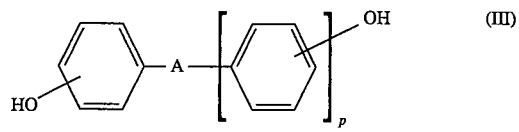

in which
p is 1 or zero and
A may be a single bond, $C_1$–$C_5$ alkylene, $C_2$–$C_5$ alkylidene, $C_5$–$C_6$ cycloalkylidene optionally substituted with methyl groups, —O—, —S— and —$SO_2$—.

The component A) polycarbonates may be both linear and branched, they may contain aromatically-attached methyl groups and are halogen-free. The component A) polycarbonates may be used both individually and as a mixture.

The diphenols of the formula (III) are either known from the literature or may be produced using processes known from the literature. Production of component A) polycarbonates which are suitable according to the invention is likewise known from the literature and may, for example, proceed with phosgene using the phase interface process or with phosgene using the homogeneous phase process (the so-called pyridine process), wherein the molecular weight to be established is achieved in a known manner with an appropriate quantity of known chain terminators.

Suitable diphenols of the formula (III) are, for example, hydroquinone, resorcinol, 4,4'-dihydroxydiphenyl, 2,2-bis-(4-hydroxyphenyl)propane (bisphenol A), 2,4-bis-(4-hydroxyphenyl)-2-methylbutane, 2,2-bis-(4-hydroxy-3,5-dimethylphenyl)propane, 1,1-bis-(4-hydroxyphenyl)-cyclohexane or 1,1-bis-(4-hydroxyphenyl)-3,3,5-trimethylcyclohexane. Preferred diphenols of the formula (I) are 2,2-bis-(4-hydroxyphenyl)propane and 1,1-bis-(4-hydroxyphenyl)cyclohexane. Mixtures of diphenols may also be used, for example of bisphenol A and up to 60 mol. % of 1,1-bis-(4-hydroxyphenyl)-3,3,5-trimethylcyclohexane.

Both homopolycarbonates and copolycarbonates are suitable. For the preparation of copolycarbonates A) according to the invention it is also possible to use 1 to 25% by weight, preferably 2.5 to 25% by weight (based on the total quantity of diphenols to be used), of diphenols of the formula (IIIa)

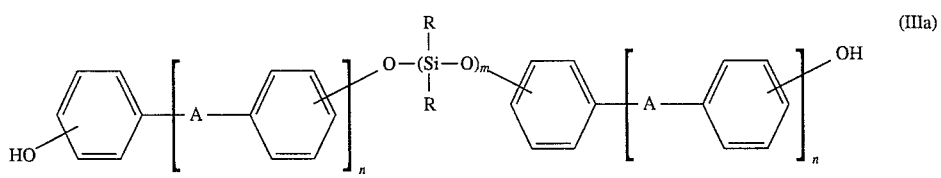

in which
- -A- has the meaning mentioned for formula (III), n is 1 or zero, the R's are identical or different and are linear $C_1$–$C_{20}$-alkyl, branched $C_3$–$C_{20}$-alkyl or $C_6$–$C_{20}$-aryl, preferably $CH_3$, and m is an integer between 5 and 100, preferably between 20 and 80.

Polydiorganosiloxanes containing hydroxy-aryloxy end groups according to formula (IIIa) are known (see for example U.S. Pat. No. 3,419,634) or can be prepared by processes known from the literature. The preparation of polydiorganosiloxane-containing copolycarbonates is described for example in DE-OS 3 334 782.

The polycarbonates A) may be partially or entirely replaced with aromatic polyester carbonates.

Suitable chain terminators are, for example, phenol or p-tert.-butylphenol, but also long-chain alkylphenols, such as 4-(1,3-tetramethylbutyl)phenol according to DE-OS 2 842 005 or monoalkylphenols or dialkylphenols having a total of 8 to 20 C atoms in the alkyl substituents according to DE-OS 3 506 472, such as, for example, p-nonylphenol, 2,6-di-tert.-butylphenol, p-tert.-octylphenol, p-dodecylphenol, 2-(3,5-dimethyl-heptyl)phenol and 4-(3,5-dimethylheptyl)phenol. The quantity of chain terminators to be used is generally between 0.5 and 10 mol. % relative to the total of the &phenols (III) used in each case.

The component A) polycarbonates which are suitable according to the invention may be branched in a known manner, namely preferably by the incorporation of 0.05 to 2.0 mol. %, relative to the total of diphenols used, of trifunctional or greater than trifunctional compounds, for example such compounds having three or more than three phenolic OH groups.

The polycarbonates which are suitable according to the invention have weight average molecular weights ($\overline{M}_w$, measured for example by ultracentrifugation or light scattering) of 10,000 to 200,000, preferably of 20,000 to 80,000.

Component B.1)

Component B.1) vinyl (co)polymers which may be used according to the invention are resinous, thermoplastic and contain no rubber. They are such compounds prepared from at least one monomer selected from styrene, α-methylstyrene, ring-alkyl substituted styrene, $C_1$–$C_8$ alkyl acrylate, $C_1$–$C_8$ alkyl methacrylate (component B.1.1) with at least one monomer selected from acrylonitrile, methacrylonitrile, $C_1$–$C_8$ alkyl methacrylate, $C_1$–$C_8$ alkyl acrylate, maleic anhydride and/or N-substituted maleimide and/or vinyl acetate (component B.1.2).

$C_1$–$C_8$ alkyl acrylates or $C_1$–$C_8$ alkyl methacrylates are esters of acrylic acid and methacrylic acid respectively and polyhydric alcohols having 1 to 8 C atoms. Methacrylic acid methyl, ethyl and propyl esters are particularly preferred. Methacrylic acid methyl ester is cited as a particularly preferred methacrylic ester.

Thermoplastic copolymers having a composition according to component B.1) may arise as by-products of graft polymerisation during production of component C), especially if large quantities of monomers are grafted onto small quantities of rubber. The quantity of copolymer B.1) to be used according to the invention does not include these by-products of graft polymerisation.

The thermoplastic copolymers B.1) contain 50 to 95 wt. %, preferably 60 to 90 wt. % of component B.1.1) and 5 to 50 wt. %, preferably 10 to 40 wt. %, of component B.1.2).

Particularly preferred copolymers B.1) are those prepared from styrene, with acrylonitrile and optionally with methyl methacrylate, from α-methylstyrene with acrylonitrile and optionally with methyl methacrylate, or from styrene and α-methylstyrene with acrylonitrile and optionally with methyl methacrylate.

The component B.1) styrene/acrylonitrile copolymers are known and may be produced by free-radical polymerisation, in particular by emulsion, suspension, solution or bulk polymerisation. The component B.1) copolymers preferably have molecular weights ($\overline{M}_w$, weight average, determined by light scattering or sedimentation) of between 15,000 and 200,000.

Particularly preferred copolymers B.1 ) according to the invention are also random copolymers prepared from styrene, maleic anhydride and/or N-substituted maleimide, which may be produced from the corresponding monomers by continuous bulk or solution polymerisation with incomplete conversion.

The proportions of the two components of the random styrene/maleic anhydride copolymers which are suitable according to the invention may be varied within broad limits. The preferred content of maleic anhydride is between 5 and 25 wt. %.

The molecular weights (number average $\overline{M}_n$) of the component B.1) random styrene/maleic anhydride copolymers which are suitable according to the invention may vary within broad limits. The range from 60,000 to 200,000 is particularly preferred. The preferred intrinsic viscosity for these products is from 0.3 to 0.9 dl/g (measured in dimethylformamide at 25° C).

Instead of styrene, the vinyl copolymers B.1) may also contain ring-substituted styrenes such as vinyltoluenes, 2,4-dimethylstyrene and other halogen-free, substituted styrenes such as α-methylstyrene.

Component B.2)

The component B.2) polyalkylene terephthalates are reaction products prepared from aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol. %, relative to the diol component, of ethylene glycol and/or 1,4-butanediol residues.

Preferred polyalkylene terephthalates may contain in addition to terephthalic acid residues up to 20 mol. %, preferably up to 10 mol. %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, naphthalene-2,6-dicarboxylic acid, 4,4-diphenyldicarboxylic acid, succinic acid, adipic acid, sebacic acid, azelaic acid, cyclohexanediacetic acid.

The preferred polyalkylene terephthalates may contain, in addition to ethylene glycol or 1,4-butanediol residues, up to 20 mol. %, preferably up to 10 mol. % of other aliphatic diols having 3 to 12 C atoms or cycloaliphatic diols having 6 to 12 C atoms or cycloaliphatic diols with 6 to 21 C atoms, for example residues of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2-bis-(4-hydroxypropoxyphenyl)propane (DE-OS 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-OS 1 900 270 and U.S. Pat. No. 3,692,744. Examples of preferred branching agents are trimesic acid, trimellitic acid, triethylolethane and -propane and pentaerythritol.

Particularly preferred polyalkylene terephthalates are those produced solely from terephthalic acid and the reactive derivatives thereof (for example, the dialkyl esters thereof) and ethylene glycol and/or 1,4-butanediol, and mixtures of these polyalkylene terephthalates.

Preferred mixtures contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in a Ubbelohde viscosimeter.

The polyalkylene terephthalates may be produced using known methods (see for example *Kunststoff-Handbuch*, volume VIII, pages 695 et seq., Carl-Hanser Verlag, Munich 1973).

Component C)

The graft polymers C) are produced by free-radical copolymerisation of the monomer mixtures C.1) prepared from C.1.1) and C.1.2) in the presence of the rubbers to be grafted C.2) and are well known. Preferred production processes for the graft polymers C) are emulsion, solution, bulk or suspension polymerisation. Particularly preferred graft polymers C) are the so-called ABS polymers.

Examples of monomers C.1) according to C.1.1) are styrene, α-methylstyrene, p-methylstyrene, methyl methacrylate or mixtures thereof. Examples of monomers according to C.1.2) are acrylonitrile, methacrylonitrile, methyl methacrylate, n-butyl acrylate, t-butyl acrylate, maleic anhydride and N-phenylmaleimide or mixtures thereof. Preferred monomers according to C.1.1) are styrene, α-methylstyrene and methyl methacrylate. Preferred monomers according to C.1.2) are acrylonitrile, maleic anhydride and methyl methacrylate. Particularly preferred monomers are styrene and acrylonitrile.

Suitable rubbers C2) for production of the component C) graft polymers are in particular polybutadienes, polyisoprenes, styrene/butadiene copolymer rubbers, acrylonitrile/butadiene copolymer rubbers having gel contents (measured at 20° C.) of greater than 30 wt. %, acrylate rubbers, EPDM (ethylene/propylene/diene monomer) rubbers and silicone rubbers.

Preferred rubbers C.2) are diene rubbers (for example based on butadiene, isoprene etc.) or mixtures of diene rubbers or copolymers of diene rubbers or mixtures thereof with further copolymerisable monomers, for example according to C.1.1) and C.1.2), providing that the glass transition temperature of component C.2) is below 10° C., preferably below −10° C.

Particularly preferred polymers C) are, for example, ABS polymers as are described in DE-OS 2 035 390 or in DE-OS 2 248 242.

Suitable acrylate rubbers C2) are those based on $C_1$–$C_8$ alkyl acrylates, in particular ethyl, butyl, ethylhexyl acrylate. These alkyl acrylate rubbers may optionally contain up to 30 wt. %, relative to the weight of the rubber, of copolymerised monomers such as vinyl acetate, acrylonitrile, styrene, α-methylstyrene, ring-alkylated styrene, methyl methacrylate, acrylamides and/or vinyl ethers. These alkyl acrylate rubbers may moreover also contain small quantities, preferably up to 5 wt. %, relative to the weight of the rubber, of ethylenically unsaturated monomers with a crosslinking action. Such crosslinking agents are, for example, alkylenediol di(meth)acrylates, polyester di(meth)acrylates, divinylbenzene, trivinylbenzene, triallyl cyanurate, allyl (meth) acrylate, butadiene or isoprene.

Preferred crosslinking monomers are allyl methacrylate, ethylene glycol dimethacrylate, diallyl phthalate and heterocyclic compounds which have at least three ethylenically unsaturated groups. Particularly preferred crosslinking monomers in this case are triallyl cyanurate, triallyl isocyanurate, trivinyl cyanurate, triacryloyl-hexahydro-s-triazine, triallylbenzenes. The quantity of the crosslinking monomers is preferably 0.02 to 5.0 wt. %, in particular 0.05 to 2.0 wt. %, relative to the grafting backbone C.2). In the case of cyclic crosslinking monomers with at least three ethylenically unsaturated groups, it is advantageous to restrict this quantity to less than 1 wt. % of the grafting backbone C.2).

Acrylate rubber grafting backbones may also be products which contain a core of crosslinked diene rubber prepared from one or more conjugated dienes, such as polybutadiene, or a copolymer of a conjugated diene with an ethylenically unsaturated monomer, such as styrene and/or acrylonitrile.

Preferred rubbers for the production of the graft polymers C) are pure diene and acrylate rubbers.

Further suitable grafting backbones according to C.2) are silicone rubbers having active grafting sites as are described in DE-OS 3 704 657, DE-OS 3 704 655 and DE-OS 3 631 539.

The rubbers are present in the graft polymers C) in the form of at least partially crosslinked particles of an average particle diameter of 0.1 to 3.0 μm, in particular of 0.2 to 0.6 μm. They are at least partially crosslinked, i.e. they have gel contents of greater than 20 wt. %, in particular of greater than 50 wt. %, particularly preferably in the range from 73 to 98 wt. % (measured in toluene).

Component D)

Component D), which acts as the flame retardant, consists of a silicone resin D.1) and a thermoplastic polyphenylene ether in the effective quantities relative to the composition A) to C). The composition of D) is 5 to 50 wt. %, preferably 5 to 25 wt. %, of D.1) and 50 to 95 wt. %, preferably 75 to 95 wt. %, of D.2).

The silicone resins D.1) according to the present invention are solid, pulverulent and contain hydroxyl groups. They have the empirical formula (IV), in which $$R_xSi(OR^3)_yO_{4-x-y/2}.\qquad(IV)$$

R denotes a monovalent hydrocarbon residue, which may optionally itself be substituted, in particular a methyl or phenyl group, $R^3$ is an alkyl group, preferably methyl, or a hydrogen residue, x has a value of 0.75 to 1.75, y has a value of 0.0001 to 0.5 and in which the silicone resin is synthesised from units of the formula $SiO_{4/2}$, $RSiO_{3/2}$, $R_2SiO_{2/2}$ and/or $R_3SiO_{1/2}$.

Production of the silicone resins of the formula (IV) is known. For the purposes of further processing or use, they are in the form of solutions in suitable solvents, also in a solution of polydimethylsiloxanes, in the form of aqueous emulsions containing solvents or as the pure substance. A further advantageous form for use is the coprecipitation product of dispersions prepared from polymers and graft polymers with emulsions of silicone resins containing solvents. This ensures the most finely divided distribution within the plastic moulding compositions.

Component D.2) polyphenylene ethers have the formula (V),

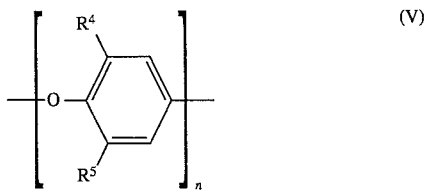

in which the ether oxygen atom of one unit is in each case attached to the aromatic ring of the adjacent unit, n is a positive integer of >20 and $R^4$ and $R^5$ mutually independently denote hydrogen, hydrocarbon residues without a tertiary α-carbon atom and oxyhydrocarbon residues, for example methyl, ethyl, propyl, methoxy, ethoxy, propoxy.

Polyphenylene ethers of the above formula and the production thereof by catalysed oxidative coupling from phenols and gases containing oxygen in the presence of metal amine complex catalysts are described in U.S. Pat. Nos. 3,306,874, 3,306,875, 3,257,357 and 3,257,358 and DE-OS 3 035 599 and in Houben-Weyl, *Methoden der Organischen Chemie*, volume E20 (1987), pages 1320–1388.

Suitable polyphenylene ethers are, for example, poly-(2,6-dimethyl-1,4-phenylene) ether, poly-(2,6-diethyl-1,4-phenylene) ether, poly-(2-methyl-6-ethyl-1,4,-phenylene) ether, poly-(2-methyl-6-propyl-1,4-phenylene) ether, poly-(2,6-diisopropyl-1,4-phenylene) ether, poly-(2-ethyl-6-propyl-1,4-phenylene) ether or copolymers such as those containing 2,3,6-trimethylphenol, together with mixtures of various polyphenylene ethers. Poly-(2,6-dimethyl-1,4-phenylene) ether or copolymers prepared from 2,6-dimethyl-phenol and 2,3,6-trimethylphenol are preferred. The polyphenylene ethers generally have an intrinsic viscosity of 0.3 to 0.7 dl/g measured in a chloroform solution at 25° C.

Component E.1)

The polymer blends according to the invention contain phosphorus compounds of the formula (I) as flame retardants,

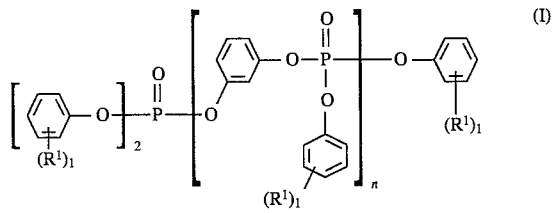

in which n, $R^1$ and l have the above-stated meaning.

Mixtures of various phosphates may also be used as component E.1) according to the invention. In this case, n has an average value of between 1 and 5, preferably 1 and 2.

The preferably used phosphorus compound of the formula (I) is phenylene bis-(diphenyl phosphate) where n equals 1 and 2 or between 1 and 2.

Component E.2)

The blends according to the invention may moreover contain as flame retardant a mixture of phosphorus compound(s) of the formula (I) and phosphorus compound(s) of the formula (II),

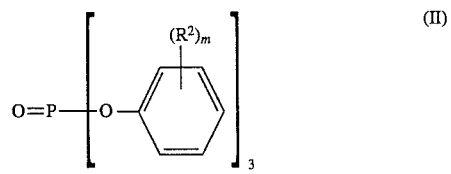

in which $R^2$ and m have the above-stated meaning.

Triphenyl phosphate is preferably used as the phosphorus compound of the formula (II).

The mixture preferably contains 2 to 30 wt. % of phosphorus compound of the formula (II), relative to 100 wt. % of E.1 and E.2.

The phosphates may generally be produced using known processes (see for example Ullmann, *Enzyklopädie der Technischen Chemie*, volume 18, pages 301 et seq., 1979; Houben-Weyl, *Methoden der Organischen Chemie*, volume 12/1, page 43; Beilstein, volume 6, page 177).

The moulding compositions according to the invention may moreover additionally contain one or more of the following flame retardants:

salts with flame inhibiting properties for polycarbonate metal compounds with a synergistic action.

The potassium salt of diphenylsulphonesulphonic acid is a preferred salt.

The moulding compositions according to the invention may furthermore contain customary additives such as lubricants and mould release agents, plasticisers, nucleating agents, antistatic agents, stabilisers, fillers and reinforcing materials together with dyes and pigments. Preferred reinforcing materials are glass fibre, preferred fillers glass beads, mica, quartz, talcum, wollastonite, preferred pigments carbon black and titanium dioxide.

The thermoplastic moulding compositions according to the invention containing components A) to E) are produced by mixing the individual constituents in a known manner and melt-compounding them at temperatures of 200° to 300° C. in customary equipment such as internal kneaders, extruders or twin screw extruders.

The individual constituents may be mixed in a known manner both successively and simultaneously, and in fact at elevated temperature.

The present invention thus also provides a process for the production of thermoplastic polycarbonate moulding compositions consisting of components A) to E), which is characterised in that the particular above-stated constituents are mixed in a known manner and then melt-compounded or melt-extruded at temperatures of 200° C. to 300° C. in customary equipment.

The moulding compositions of the present invention may be used for the production of mouldings of any kind. Mouldings may in particular be produced by injection moulding. Examples of mouldings which may be produced are: casing components of all kinds (for example for domestic appliances and office equipment) or covers for the construction sector and components for the automotive sector. They are also used in the electrical engineering sector because they have very good electrical properties.

The moulding compositions are particularly suitable for the production of thin-walled mouldings (for example data processing equipment casing components), where particularly severe requirements are placed upon the plastics used with regard to notched impact strength, stress cracking behaviour and dimensional stability.

Particle size always means average particle diameter $d_{50}$, determined by ultracentrifuge measurements in accordance with W. Scholtan et al., *Kolloid-Z. & Z. Polymere* 250 (1972), 782 to 796.

EXAMPLES

Materials Used

Component A)

Bisphenol A based polycarbonate with a relative solution viscosity of 1.34, measured in methylene chloride at 25° C. and a concentration of 0.5 g/100 ml.

Component B)

Styrene/acrylonitrile copolymer with a styrene/acrylonitrile ratio of 72:28 and an intrinsic viscosity of 55 dl/g (measured in dimethylformamide at 20° C.).

Component C)

Graft polymer of 45 wt. % styrene/acrylonitrile in a 72:28 ratio on 55 wt. % of particulate crosslinked polybutadiene rubber (average particle diameter $d_{50}$=0.4 μm) produced by emulsion polymerisation.

Component D.1)

Baysilone resin M 120 XB, solvent removed in rotary evaporator, 100% (methylsilicone resin from Bayer AG).

Component D.1 )

SFR100 (methylsilicone resin in polydimethylsiloxane from General Electric Silicones).

Component D.2)

Polyphenylene oxide produced from 2,6-dimethylphenol according to DE-OS 3 035 599, with an intrinsic viscosity of 0.42 dl/g measured in chloroform at 25° C.

Component E.1)

Fyroflex RDP, from Akzo B. V. (oligomer mixture with approximately 60 to 65% content of m-phenylene-bis-(diphenyl phosphate).

Component E.2)

Mixture of 75.0 wt. % of Fyroflex RDP (see component E.1) and 25.0 wt. % of triphenyl phosphate (Disflamoll TP, from Bayer AG).

Production and Testing of Moulding Compositions

The flame-resistant thermoplastic moulding compositions were produced by kneading in a model W 50 E small-scale kneader from the company Brabender OHG, Duisberg within the temperature range from 210° to 230° C., at a rotational speed of 60 min$^{-1}$ and a kneading time of 10 minutes. The resultant moulding composition was compression moulded into 4.0 or 1.6 mm sheets using an electrically heated Polystat 200 T laboratory compression moulding machine from the company Schwabenthan, the compression temperature was 200° C., the pressure 200 bar and duration 5 minutes.

The required test specimens were sawn from the sheets and subjected to the following tests:

heat resistance to DIN 53 460 (Vicat B) on bars of dimensions 80×10×4 mm, flammability test using Underwriters' Laboratories method (UL-94) on bars of a thickness of 1.6 mm.

Stress cracking behaviour was investigated on bars of dimensions 80×10×4 mm, compression temperature 220° C. The test medium used was a mixture of 60 vol. % toluene and 40 vol. % isopropanol. The test pieces were pre-stressed on a circular arc template (initial elongation in percent) and stored in the test medium at room temperature. Stress cracking behaviour was determined by assessing failure as a function of initial elongation in the test medium at an exposure time of 5 minutes.

TABLE

Compositions and properties of moulding compositions:

| Examples | A | B | C | D1 | D2 | E1 | E2 | ESC Failure at ex [%] | Vicat B 120 [°C.] | UL94V 1.6 mm |
|---|---|---|---|---|---|---|---|---|---|---|
| 1 | 69 | 4 | 10 | 1 | 1 | — | 15 | 1.6 | 89 | V-0 |
| 2 | 69 | 5 | 10 | 1 | 1 | — | 14 | 1.8 | 91 | V-0 |
| 3 | 69 | 6 | 10 | 1 | 1 | — | 13 | 2.0 | 93 | V-0 |
| 4 | 69 | 4 | 10 | 1 | 1 | 15 | — | 1.4 | 91 | V-0 |
| 5 | 69 | 5 | 10 | 1 | 1 | 14 | — | 1.6 | 93 | V-0 |
| 6 | 69 | 6 | 10 | 1 | 1 | 13 | — | 1.8 | 95 | V-0 |

The moulding compositions according to the invention (examples 1 to 6) exhibit a very favourable combination of properties comprising flame retardancy, heat resistance and stress cracking behaviour. In examples 1 to 3 and 4 to 6, even small proportions of polyphenylene oxide and silicone resin allow a distinct reduction in the quantity of phosphate without losing the V-0 rating. Heat resistance and ESC behaviour are improved as a consequence of this synergistic effect.

The above-stated favourable combination of properties of the moulding compositions according to the invention is achieved even if a mixture of component E.1 and a monophosphate such as, for example, triphenyl phosphate, is used instead of the resorcinol diphosphate. An additional advantage of these moulding compositions is their improved stress cracking resistance (see comparison of example 1 to 3 with 4 to 6). Exclusive use of the monophosphates as the phosphate component E results in severely impaired heat resistance.

We claim:

1. Halogen-free thermoplastic moulding compositions consisting of

A) 50 to 95 wt. % of thermoplastic aromatic polycarbonate,

B) 0 to 20 wt. % of copolymer or polycondensation product consisting of
   B.1) thermoplastic copolymer prepared from
      B.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and
      B.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide, vinyl acetate or mixtures thereof and/or
   B.2) thermoplastic polyalkylene terephthalate, C) 3 to 18 wt. % of graft polymer produced from
   C.1) 5 to 90 wt. % of a mixture prepared from
      C.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and C.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide or mixtures thereof on C.2) 10 to 95 wt. % of rubber with a glass transition temperature $T_g$ of $\leq 10°$ C., D) 1 to 20 wt. % of a combination with flame retardant action prepared from D.1) 5 to 50 wt. % of silicone resin containing hydroxyl groups and having the empirical formula (IV)

in which

R denotes a monovalent hydrocarbon residue, which may optionally itself be substituted, $R^3$ is a hydrogen residue, x has a value of 0.75 to 1.75, y has a value of 0.0001 to 0.5 and in which the silicone resin is synthesized from units of the formula $SiO_{4/2}$, $RSiO_{3/2}$, $R_2SiO_{2/2}$ and/or $R_3SiO_{1/2}$, and D.2) 50 to 95 wt. % of thermoplastic polyphenylene ether, E) 3 to 18 wt. % of phosphoric acid ester prepared from E.1) phosphorus compounds of the formula (I),

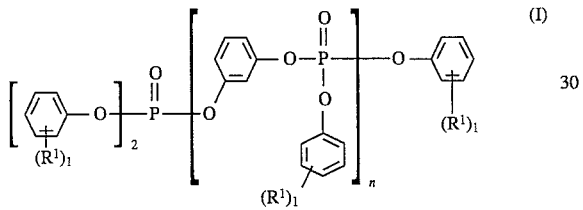

in which n is a number from 1 to 5, $R^1$ is methyl and l is a number from 0 to 5, or E.2) a mixture of phosphorous compounds of the formula (I) and phosphorus compounds of the formula (II),

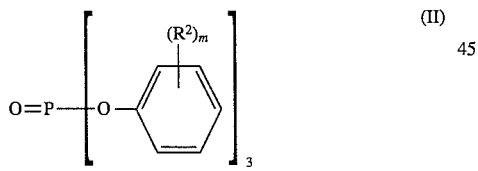

in which $R^2$ is methyl and m is the number 0 to 5, wherein the quantity of phosphorus compounds of the formula (II) in the phosphate mixture prepared from E.1) and E.2) is at most 35 wt. %.

2. Thermoplastic moulding compositions according to claim 1, wherein the compositions contain the components A) in a quantity of 60 to 90 wt. %, B) in a quantity of 1 to 15 wt. %, C) in a quantity of 5 to 15 wt. %, D) in a quantity of 2 to 15 wt. % and E) in a quantity of 5 to 15 wt. %.

3. Thermoplastic moulding compositions according the claim 1, characterised in that mixtures of m-phenylene-bis-(diphenyl phosphate) and triphenyl phosphate are used as component E).

4. Thermoplastic moulding compositions according to claim 1, which contain salts with flame inhibiting properties for polycarbonate and/or metal compounds with a synergistic action as additional flame retardants.

5. Thermoplastic moulding compositions according to claim 1, additionally containing additives such as lubricants and mould release agents, plasticisers, nucleating agents, stabilisers, antistatic agents, fillers and reinforcing materials, dyes and/or pigments.

6. Process for the production of thermoplastic polycarbonate moulding compositions according to claim 1, wherein the components A) to E) are mixed in a known manner and then melt-compounded or melt-extruded at temperatures of 200° C. to 300° C. in customary equipment.

7. Mouldings produced from thermoplastic moulding compositions according to claim 1.

8. Thermoplastic moulding compositions according to claim 1, wherein R in formula (IV) is a methyl group or a phenyl group.

9. Thermoplastic moulding compositions according to claim 1, wherein component C.2) is selected from the group consisting of diene rubbers and acrylate rubbers.

10. Thermoplastic moulding compositions according to claim 1, wherein component C.2) is a diene rubber.

11. Thermoplastic moulding compositions according to claim 1, wherein silicone resins of the formula (IV) are used as component D.1) and polyphenylene ethers of the formula (V) as D.2)

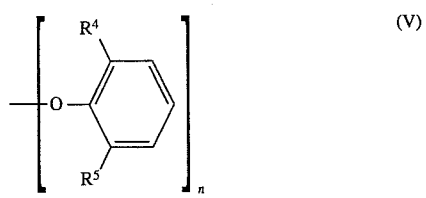

in which the ether oxygen atom of one unit is in each case attached to the aromatic ring of the adjacent unit, n is a positive integer of >20 and $R^4$ and $R^5$ mutually independently denote hydrogen, hydrocarbon residues without a tertiary α-carbon atom and oxyhydrocarbon residues.

12. Halogen-free thermoplastic moulding compositions consisting of

A) 50 to 95 wt. % of thermoplastic aromatic polycarbonate,

B) 0 to 20 wt. % of copolymer or polycondensation product consisting of

B.1) thermoplastic copolymer prepared from

B.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and B.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide, vinyl acetate or mixtures thereof and/or B.2) thermoplastic polyalkylene terephthalate, C) 3 to 18 wt. % of graft polymer produced from C.1) 5 to 90 wt. % of a mixture prepared from C.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and C.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide or mixtures thereof on C.2) 10 to 95 wt. % of rubber with a glass transition temperature $T_g$ of $\leq 10°$ C., D) 1 to 20 wt. % of a combination with flame retardant action prepared from D.1) 5 to 50 wt. % of a silicone resin containing hydroxyl groups and having the empirical formula (IV)

in which
R denotes a monovalent hydrocarbon residue, which may optionally itself be substituted,
$R^3$ is selected from the group consisting of alkyl groups and hydrogen residues, with the limitation that at least one of the $R^3$ groups is a hydrogen residue,
has a value of 0.75 to 1.75,
y has a value of 0.0001 to 0.5 and
in which the silicone resin is synthesized from units of the formula $SiO_{4/2}$, $RSiO_{3/2}$, $R_2SiO_{2/2}$ and/or $R_3SiO_{1/2}$, and D.2) 50 to 95 wt. % of thermoplastic polyphenylene ether, E) 3 to 18 wt. % of phosphoric acid ester prepared from
E.1) phosphorus compounds of the formula (I),

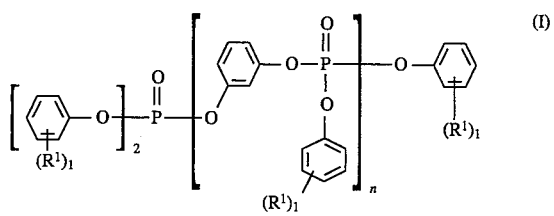

in which
n is a number from 1 to 5,
$R^1$ is methyl and
l is a number from 0 to 5,
or E.2) a mixture of phosphorous compounds of the formula (I) and phosphorus compounds of the formula (II),

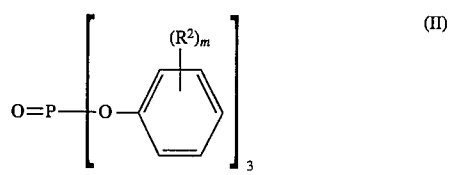

in which
$R^2$ is methyl and
m is the number 0 to 5,
wherein the quantity of phosphorus compounds of the formula (II) in the phosphate mixture prepared from E.1) and E.2) is at most 35 wt. %.

13. Thermoplastic moulding compositions according to claim 12, wherein $R^3$ in formula (IV) is selected from the group consisting of a methyl group and a hydrogen residue, with the limitation that at least one of the $R^3$ groups is a hydrogen residue.

14. Thermoplastic moulding compositions according to claim 12, wherein silicone resins of the formula (IV) are used as component D.1) and polyphenylene ethers of the formula (V) as D.2)

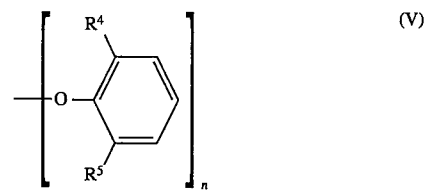

in which the ether oxygen atom of one unit is in each case attached to the aromatic ring of the adjacent unit, n is a positive integer of >20 and $R^4$ and $R^5$ mutually independently denote hydrogen, hydrocarbon residues without a tertiary α-carbon atom and oxyhydrocarbon residues.

15. Thermoplastic moulding compositions according to claim 12, wherein the compositions contain the components A) in a quantity of 60 to 90 wt. %, B) in a quantity of 1 to 15 wt. %, C) in a quantity of 5 to 15 wt. %, D) in a quantity of 2 to 15 wt. % and E) in a quantity of 5 to 15 wt. %.

16. Thermoplastic moulding compositions according to claim 12, characterised in that mixtures of m-phenylene-bis-(diphenyl phosphate) and triphenyl phosphate are used as component E).

17. Thermoplastic moulding compositions according to claim 12, which contain salts with flame inhibiting properties for polycarbonate and/or metal compounds with a synergistic action as additional flame retardants.

18. Thermoplastic moulding compositions according to claim 12, additionally containing additives such as lubricants and mould release agents, plasticisers, nucleating agents, stabilisers, antistatic agents, fillers and reinforcing materials, dyes and/or pigments.

19. Process for the production of thermoplastic polycarbonate moulding compositions according to claim 12, wherein components A) to E) are mixed in a known manner and then melt-compounded or melt-extruded at temperatures of 200° C. to 300° C. in customary equipment.

20. Mouldings produced from thermoplastic moulding compositions according to claim 12.

* * * * *

UNITED STATES PATENT AND TRADEMARK OFFICE
CERTIFICATE OF CORRECTION

PATENT NO. : 5,621,029
DATED : April 15, 1997
INVENTOR(S) : Eckel et al.

It is certified that error appears in the above-identified patent and that said Letters Patent is hereby corrected as shown below:

On the cover page, Item [56] References Cited, FOREIGN PATENT DOCUMENTS,

"05222653    1/1993    European Pat. Off." should read
--0522653    1/1993    European Pat. Off.--.

In Column 15, line 16 (Claim 12), "x" should be inserted before "has a value of 0.75 to 1.75,".

Signed and Sealed this

Eighth Day of September, 1998

Attest:

BRUCE LEHMAN

Attesting Officer                Commissioner of Patents and Trademarks